United States Patent
Francis et al.

(10) Patent No.: US 11,909,766 B2
(45) Date of Patent: Feb. 20, 2024

(54) MANAGING A SEGMENTATION POLICY FOR WORKLOADS IN A SECURE ENCLAVE

(71) Applicant: Illumio, Inc., Sunnyvale, CA (US)

(72) Inventors: George Jeffrey Francis, Snohomish, WA (US); Matthew Kirby Glenn, Mountain View, CA (US); Jalandip Lepcha, San Jose, CA (US); Paul James Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 250 days.

(21) Appl. No.: 16/775,248

(22) Filed: Jan. 28, 2020

(65) Prior Publication Data

US 2021/0234900 A1    Jul. 29, 2021

(51) Int. Cl.
*H04L 9/40* (2022.01)
*H04M 15/00* (2006.01)
*H04L 41/0893* (2022.01)
*H04L 47/20* (2022.01)

(52) U.S. Cl.
CPC .......... *H04L 63/20* (2013.01); *H04L 41/0893* (2013.01); *H04L 47/20* (2013.01); *H04L 63/0263* (2013.01); *H04M 15/66* (2013.01)

(58) Field of Classification Search
CPC ..... H04L 63/20; H04L 41/0893; H04L 47/20; H04L 63/0263
See application file for complete search history.

(56) References Cited

U.S. PATENT DOCUMENTS

| | | | |
|---|---|---|---|
| 2018/0234459 A1* | 8/2018 | Kung | H04L 63/0263 |
| 2019/0173736 A1* | 6/2019 | Ponnuswamy | H04L 41/145 |
| 2019/0238508 A1* | 8/2019 | Hira | H04L 63/0263 |
| 2020/0236086 A1* | 7/2020 | Patil | H04L 63/1416 |
| 2020/0272741 A1* | 8/2020 | Bhatia | G06F 40/284 |
| 2021/0182169 A1* | 6/2021 | Mardente | H04L 63/205 |
| 2022/0294828 A1* | 9/2022 | Keiser, Jr. | H04L 63/1425 |

FOREIGN PATENT DOCUMENTS

WO    WO-2020106973 A1 *  5/2020  ............. G06F 21/54

* cited by examiner

*Primary Examiner* — Nicholas R Taylor
*Assistant Examiner* — Sanjoy Roy
(74) *Attorney, Agent, or Firm* — Fenwick & West LLP (57) ABSTRACT

A policy management server manages a segmentation policy and automatically configures an enclave protection device consistently with the segmentation policy so that that the segmentation policy can be enforced with respect to workloads within a secure enclave protected by the enclave protection device. The policy management server identifies protected workloads that are members of a secure enclave and external workloads that are external to the secure enclave. The policy management server identifies cross-boundary rules of the segmentation policy affecting traffic between the protected workloads and external workloads. The policy management server generates and distributes a configuration of the enclave protection device to enable enforcement of the cross-boundary rules pertaining to traffic passing through the enclave protection device.

20 Claims, 5 Drawing Sheets

MANAGING A SEGMENTATION POLICY FOR WORKLOADS IN A SECURE ENCLAVE

BACKGROUND

Technical Field

This application relates generally to managing of a segmentation policy, and more specifically, to configuring an enclave protection device to enable enforcement of a segmentation policy for protected workloads in a secure enclave.

Description of Related Art

A secure enclave comprises a segment of a network that includes set of protected workloads protected by an enclave protection device such as a firewall device, cloud computing policy group management device, or switch. All traffic between the protected workloads and external workloads outside the secure enclave pass through the enclave protection device, thereby enabling the enclave protection device to protect the protected workloads from external threats. The enclave protection device may be configured by a network administrator according to an enclave protection policy comprising a set of rules controlling which traffic is allowed to pass in or out of the secure enclave.

A segmentation policy comprises a set of rules that control which workloads may communicate on a network and may place restrictions on how such workloads may communicate. In one implementation, distributed enforcement modules executing on hosts receive management instructions for configuring local firewalls to enforce the rules with respect to local workloads. A challenge exists in implementing a segmentation policy with respect to one or more protected workloads in a secure enclave because the enclave protection device may disrupt enforcement of the segmentation policy if not properly programmed to allow traffic in and out of the secure enclave consistently with the segmentation policy. This fragmentation of policy management leads to issues like operational overheads, policy correctness issues, and longer turnaround time for policy enforcement.

SUMMARY

A system, non-transitory computer-readable storage medium, and method manages a segmentation policy and automatically configures an enclave protection device consistently with the segmentation policy. A policy management server obtains a segmentation policy comprising a set of rules for controlling traffic between workloads. The policy management server detects a plurality of protected workloads that are members of a secure enclave protected by the enclave protection device such that traffic between the protected workloads and external workloads outside the secure enclave pass through the enclave protection device. The policy management server determines, from the segmentation policy, a set of cross-boundary rules pertaining to traffic between at least one of the protected workloads and at least one of the external workloads. The policy management server generates, from the set of cross-boundary rules, a configuration for the enclave protection device that causes the enclave protection device to permit the traffic meeting the set of cross-boundary rules. The policy management server distributes the configuration to the enclave protection device to enable enforcement of the cross-boundary rules.

In an embodiment, generating the configuration of the enclave protection device includes generating one or more enclave protection rules and generating membership information of workloads affected by those rules. For example, the policy management server generates an enclave protection rule that permits traffic between a first workload group identified by a first group identifier and a second workload group identified by a second group identifier that meets specified traffic criteria, and generates membership information specifying first workload identifiers for first workloads in the first workload group, and second workload identifiers for second workloads in the second workload group.

In an embodiment, the policy management server may efficient update the configuration of the enclave protection device in response to changes without re-distributing the entire configuration. For example, the policy management server may detect a change in the first workloads in the first workload group, and send updated membership information to the enclave protection device reflecting the change without sending the enclave protection rule. In another example, the policy management server may detect a change in the segmentation policy that affects the enclave protection rule and send an updated enclave protection rule to the enclave protection device reflecting the change without sending the membership information.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A policy management server manages a segmentation policy and automatically configures an enclave protection device consistently with the segmentation policy so that that the segmentation policy can be enforced with respect to workloads within a secure enclave protected by the enclave protection device. The policy management server identifies protected workloads that are members of a secure enclave and external workloads that are external to the secure enclave and identifies cross-boundary rules of the segmentation policy affecting traffic between the protected workloads and external workloads. The policy management server generates, from the set of cross-boundary rules, a configuration for the enclave protection device that causes the enclave protection device to permit the traffic meeting the set of cross-boundary rules and distributes the configuration to the enclave protection device to enable enforcement of the cross-boundary rules. Furthermore, the policy management server may efficiently distribute updates to the configuration of the enclave protection device in response to changes in the segmentation policy, the network topology, or the workloads.

Figure 1:
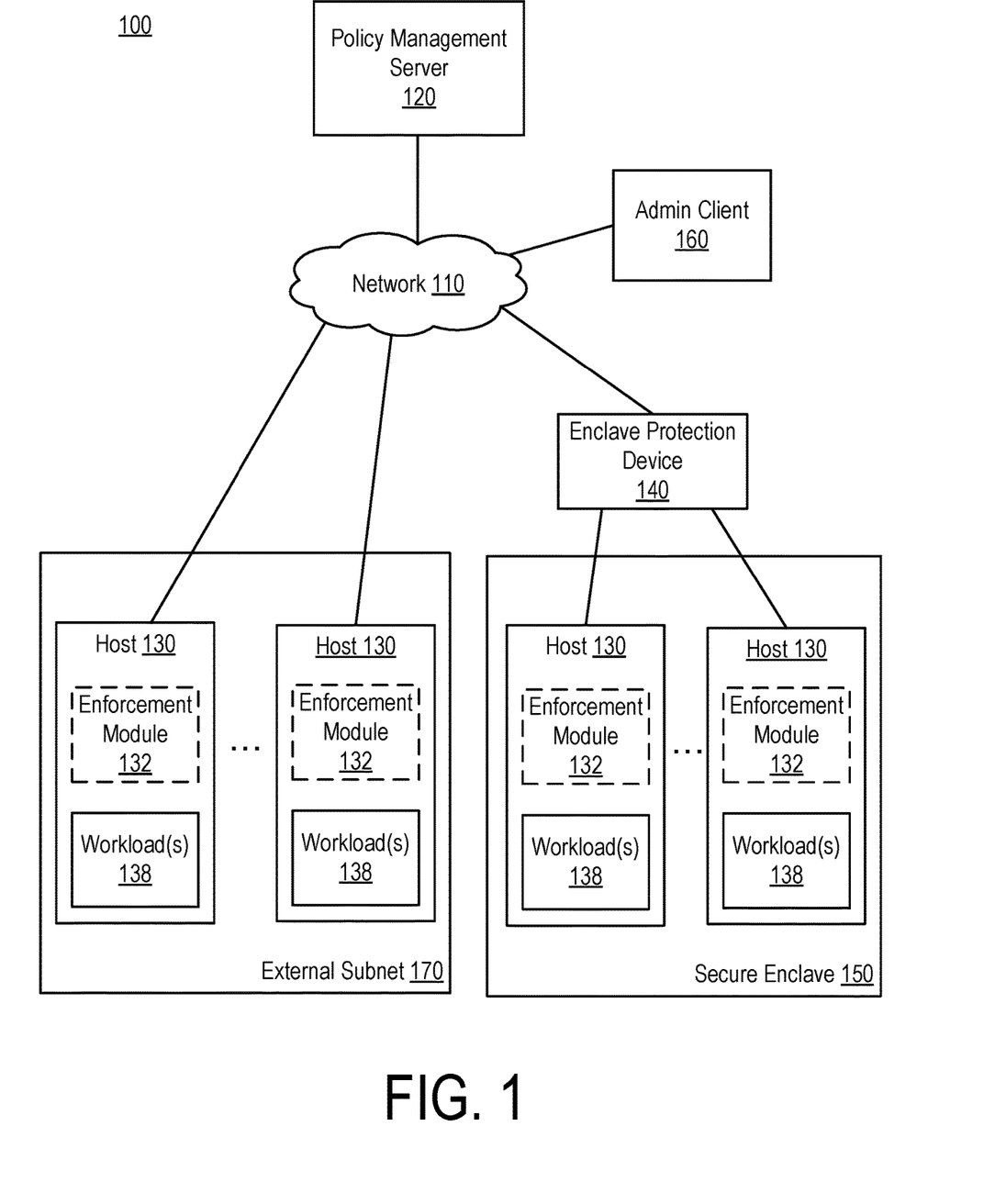
FIG. 1 is a high-level block diagram illustrating an environment for managing a segmentation policy, according to one embodiment.

FIG. 1 is a high-level block diagram illustrating a networked computing environment 100. The networked computing environment 100 includes a policy management server 120, a network 110, an administrative client 160, an enclave protection device 140 protecting workloads 138 executing on hosts 130 in a secure enclave 150, and workloads 138 executing on hosts 130 in an external subnet 170 outside the secure enclave 150. At least some of the hosts 130 may also execute an enforcement module 132 that configures local traffic filters to control communications to and from the local workloads 138 in accordance with a segmentation policy. An enforcement module 132 is not necessarily present on all of the hosts 130.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138. The workloads 138 comprise independently addressable computing units for performing computing tasks. For example, each workload 138 may be addressable on the network 110 by a specific network address associated with the host 130 and a port associated with a service provided by the workload 138. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 to perform various tasks.

The network 110 represents the communication pathways between the policy management server 120, the administrative client 160, the enclave protection device 140, and the hosts 130. In one embodiment, the network 110 uses standard communications technologies and/or protocols and can include the Internet. In another embodiment, the entities on the network 110 can use custom and/or dedicated data communications technologies.

The policy management server 120 is an application executing on a host or computer (or set of computers) that obtains and stores information about the hosts 130 on the network 110, the enclave protection device 140, and the workloads 138 executing on the hosts 130. The policy management server 120 manages a segmentation policy that regulates communications between workloads 138. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a first workload 138 is allowed to provide a particular service to a second workload 138, but the segmentation policy does not include any rule allowing the first workload 138 to provide the service to a third workload 138. Thus, given the absence of such a permissive rule, the first workload will be blocked from providing the service to the third workload. The rule may furthermore specify the type of service that the first workload is allowed to provide to the second workload 138 (e.g., a database service, a web service, etc.), what ports may be used in providing the service, and how the first and second workloads 138 may communicate when providing this service (e.g., using certain specified protocols, using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the policy management server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |

TABLE 1-continued

Example of logical management model

| Dimension | Meaning (M), Values (V) |
|---|---|
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The policy management server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The policy management server 120 may retain a repository storing information about the hosts 130 and the workloads 138 managed by the policy management server 120. For example, the policy management server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the policy management server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy may be enforced in a distributed manner. For example, at least some of the hosts 130 may include an enforcement module 132. To enable enforcement of the segmentation policy, the policy management server 120 generates a set of management instructions and distributes the management instructions to the enforcement modules 132. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the policy management server 120 may send different management instructions to different enforcement modules 132 so that each enforcement module 132 gets only the management instructions relevant to its operation. Here, the policy management server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. The policy management server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may store logs of traffic flow data indicating traffic that is blocked by a traffic filter and traffic that is allowed to pass through the traffic filter. The enforcement modules 132 may report respective traffic flow data to the policy management server 120. This traffic flow data may be appropriately labeled to enable the policy management server 120 to identify traffic flow data associated with different workloads 138. The policy management server 120 may analyze the traffic flow data to generate a graphical representation of connections being allowed and connections being blocked to enable a network administrator to visualize the permitted and blocked connections.

To enable enforcement of the segmentation policy with respect to protected workloads 138 within the secure enclave 150, the policy management server 120 may control configuration of the enclave protection device 140 consistently with the segmentation policy. Here, the policy management server 120 may configure the enclave protection device 140 to allow traffic between workloads 138 in the external subnet 170 and workloads 138 in the secure enclave 150 that is permitted by the segmentation policy. Optionally, the policy management server 120 may furthermore configure the enclave protection device 140 to block traffic that is not expressly permitted by the segmentation policy. In an embodiment, the policy management server 120 may configure the enclave protection device 140 by configuring a set of enclave protection rules that each specify a permitted connection between a first workload group (referenced by a first workload group identifier) and a second workload group (referenced by a second workload group identifier) and membership information specifying the workloads that are members of each group (e.g., referenced by IP address). The enclave protection rules may furthermore place limitations on the permitted connections by specifying, for example, a direction of the connection (inbound or outbound), a permitted protocol, permitted ports, a permitted service associated with the connection, or other constraints. The policy management server 120 may furthermore provide updates to the enclave protection rules and/or membership information in response to changes in the segmentation policy or changes in the membership information. Changes in the membership information may occur, for example, when a workload goes online or comes offline in the secure enclave 150, when a workload goes online or comes offline in the external subnet 170, or when a workload is re-assigned to a different workload group (e.g., based on a change in its label set or a workload 138 being moved between the secure enclave 150 and the external subnet 170). The policy management server 120 may independently configure or update the enclave protection rules and the membership information of an enclave protection device 140. In this manner, the policy management server 120 can efficiently provide updates to the configuration of the enclave protection device 140 by updating only the enforcement rules (without necessarily updating membership information) in response to a change in the segmentation policy, and updating only membership information (without necessarily updating the enforcement point rules) in response to a change in membership of workloads in different workload groups.

In an embodiment, the policy management server 120 may automatically generate the enclave protection device configuration based on the segmentation policy and information identifying which workloads 138 are in the secure enclave 150 and which workloads are in the external subnet 170. For example, the policy management server 120 may obtain from the enclave protection device 140, a list of protected workload identifiers (e.g., IP addresses) identifying the workloads 138 in the secure enclave 150. The list of protected workload identifiers may be compared with the segmentation policy to determine which rules of the segmentation policy are cross-boundary rules that permit traffic between a protected workload 138 within the secure enclave 150 and an external workload 138 in the external subnet 170. For example, for each segmentation rule, the policy management server 120 obtains the label sets specified in the rule, determines which workloads 138 have those label sets, and determines whether the workloads 138 are in the secure enclave 150 or the external subnet 170 based on the list of protected workload identifiers. Rules that affect traffic between at least one workload 138 in the external subnet 170 and at least one workload in the secure enclave 170 are identified as cross-boundary rules. The policy management server 120 then configures the enclave protection device 140 based on the cross-boundary rules such that the enclave protection device 140 allows traffic consistent with the cross-boundary rules to pass through it.

In an alternative embodiment, the rules of the enclave protection device 140 may be configured independently of the policy management server 120 (e.g., by a separate configuration tool operated by an administrator). These independently configured rules may specify identifiers for source and destination workload groups that are permitted to communicate through the enclave protection device 140. In this embodiment, the policy management server 120 may provide updates only to the membership information defining the individual workloads 138 in each workload group as the membership changes (without the policy management server 120 managing or updating the rules of the enclave protection device 140).

In an embodiment, the policy management server 120 an enclave protection device using a common group naming scheme for the workload groups that are based on the membership in the group. Thus, whenever a rule of the enclave protection device 140 changes, the policy management server 120 can identify the membership of the workload groups in the changed rule based on the naming scheme. In an embodiment, the group name may comprise a concatenation of the labels in the label set defining the workload group. For example, a workload group associated with a label set {Web, US} may be set to "Web US". The policy management server 120 may therefore track workloads 138 that have this label set and update the membership information to the enclave protection device 140 in response to any changes.

The administrative client 160 comprises a computing device that may be operated by an administrator managing the policy management server 120. The administrative client 160 may execute an interface (e.g., via an application or web browser) that enables the administrator to interact with the policy management server 120 to configure or view the segmentation policy. The interface may furthermore enable the administrator to obtain various information about the hosts 130, the enclave protection device 140, and workloads 138 on the network 120 and view traffic flows between the workloads 138 as described above.

Figure 2:
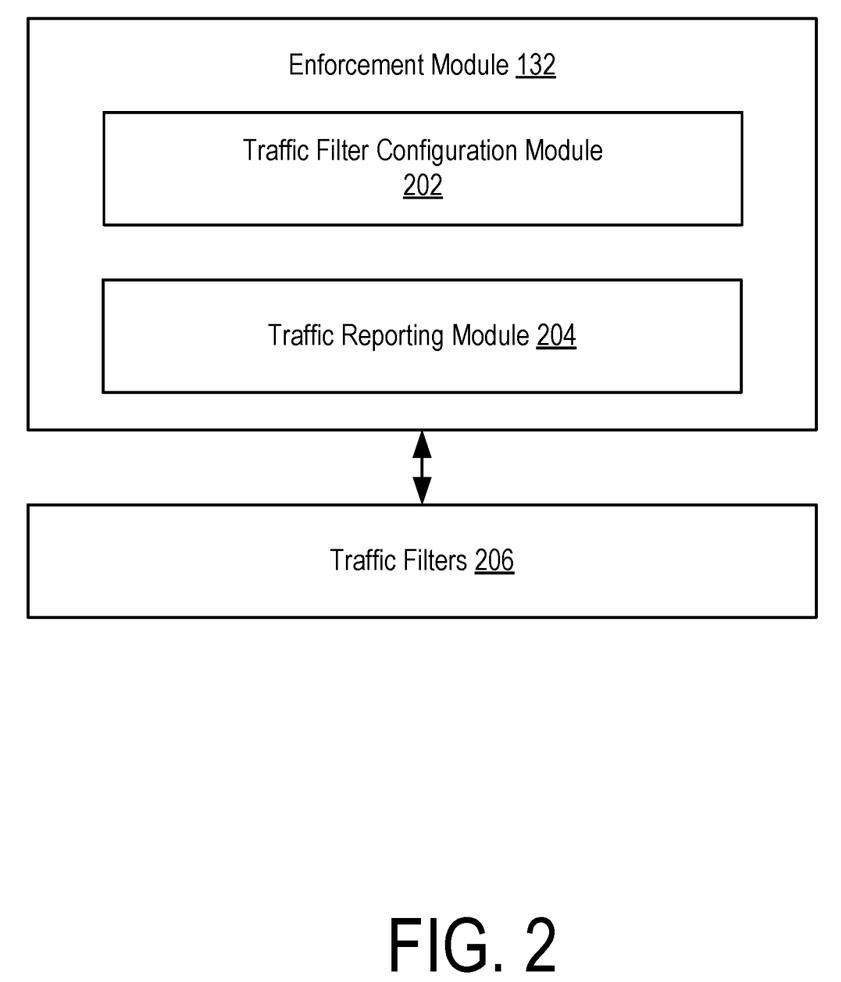
FIG. 2 is a block diagram illustrating an example embodiment of an enforcement module.

FIG. 2 illustrates an example embodiment of an enforcement module 132. The enforcement module 132 comprises a traffic filter module 202 and a traffic reporting module 204 that may each interact with one or more traffic filters 206. In alternative embodiments, the enforcement module 132 may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 206 operates to enforce the segmentation policy with respect to a workload 138 executing on a host 130. To enforce the segmentation policy, the traffic filters 206 may apply a set of packet filtering rules that block or allow communications to a particular workload based on specific criteria associated with the communications such as the source and destination network addresses and ports, protocols associated with the communication, and a connection state. In an embodiment, the segmentation rules applied by the traffic filters 206 are generally permissive rules (e.g., a white list) that specify which specific communications are permitted. A default rule may cause the traffic filters 206 to block communications (e.g., drop packets) that do not match any of the permissive rules.

In an embodiment, the traffic filters 206 may comprise an operating system-level firewall such as a Linux kernel firewall based on iptables or Netfilter modules or a Windows firewall based on a Windows Filtering Platform. Furthermore, the traffic filters 208 may comprise an Internet Protocol security (IPsec) engine that controls encryption and decryption of packets.

The traffic filter configuration module 202 receives management instructions from the policy management server 120 and translates the management instructions from a high level of abstraction to a low level of abstraction to configure the traffic filters 206 based on the segmentation policy. For example, for a given rule that permits communication between a workload 138 managed by the enforcement module 132 and a group of other workloads 138 having a specified label set, the traffic filter configuration module 202 determines workload identifiers for each of the workloads 138 having the specified label set, and configures the traffic filters 206 to permit communications with the identified workloads 138 in accordance with any restrictions (e.g., ports and protocols) specified in the given rule.

The traffic reporting module 204 obtains traffic flow data from the traffic filters 206 indicating communications that pass through the filters 206 and communications that are blocked by the filters 206. For example, the traffic flow data may indicate the source network address and port, the destination network address and port, the protocol associated with the communication, whether the communication as allowed or blocked (and according to what rule), a connection state, or other identifying information. The traffic reporting module 204 may then report the traffic flow data to the policy management server 120. In an embodiment, the traffic reporting module 204 may aggregate or filter the traffic flow data prior to reporting to the policy management server 120. Alternatively, the traffic reporting module 204 may report the raw traffic flow data to the policy management server 120.

Figure 3:
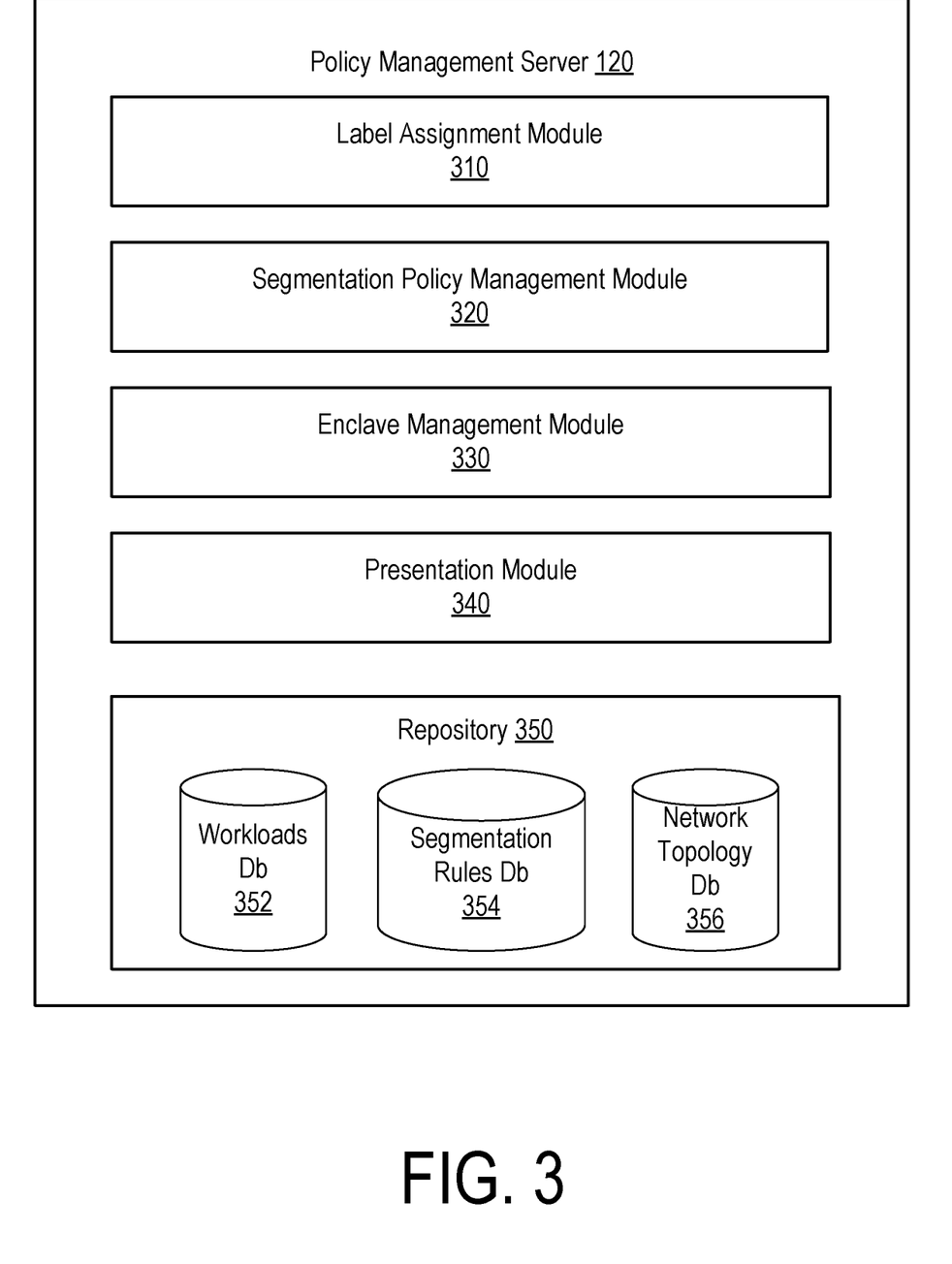
FIG. 3 is a block diagram illustrating an example embodiment of a policy management server.

FIG. 3 is a high-level block diagram of an embodiment of a policy management server 120. The policy management server 120 comprises a label assignment module 210, a segmentation policy management module 320, an enclave management module 330, a presentation module 340, and a repository 350. The repository 350 may comprise a workloads database 352 that stores associations between workloads 138 and their respective label sets, a segmentation rules database 354 that stores a segmentation policy as a set of rules, and a network topology database 356 that stores a topology of the network 120. The topology may include identification of any enclave protection devices 140, identification of workloads 138 that are within a secure enclave 150 protected by an enclave protection device 140, and identification of workloads 138 that are in an external subnet 170 outside the secure enclave 150. In alternative embodiments, the policy management server 120 may include different or additional components. The various components of the policy management server 120 may be implemented as one or more processors and a non-transitory computer-readable storage medium that stores instructions executed by the one or more processors to carry out the functions attributed to the policy management server 120 described herein.

The label assignment module 310 facilitates assignment of labels to workloads 138. For example, the label assignment module 310 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The segmentation policy management module 320 manages configuring and updating of a segmentation policy comprising a set of segmentation rules. The segmentation rules may be manually configured by a system administrator or may be generated automatically based on various predefined segmentation strategies. Once configured, the segmentation policy management module 320 distributes the rules to enforcement modules 132 to enforce the segmentation policy. For example, the segmentation policy management module 320 determines which segmentation rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The segmentation policy management module 320 may dynamically update instructions sent to the enforcement modules 132 in response to changes in the segmentation policy, changes to the labels of workloads 138, changes to the applications executing on the workloads 138, or changes to application information associated with the applications.

The enclave management module 330 manages configuring and updating of the enclave protection device 140 for consistency with the segmentation policy. The enclave management module 330 obtains a list of workload identifiers for workloads 138 within the secure enclave 150 and workloads in the external subnet 170. For example, the enclave management module 330 may obtain from the enclave protection device 140 a subnet associated with the secure enclave 150, firewall zones associated with the secure enclave 150, or identifiers for individual workloads 138 in the secure enclave 150. In the case of a subnet or firewall zones, the policy management server 120 may identify IP addresses of reported traffic that correspond to the subnet or firewall zone being protected and add the IP address to a list of workload identifiers in the secure enclave 150. The enforcement point configuration module 330 may program the enclave protection device 140 such that it permits all traffic associated with permitted connections between workloads 138 within the secure enclave 150 and workloads 138 in the external domain 170. As described above, in one embodiment, the enforcement point configuration module 330 determines which segmentation rules are relevant to the enclave protection device 140 by identifying cross-boundary rules that permit connections between workloads 138 having label sets consistent with one or more workloads 138 in the secure enclave 150 and workloads 138 having label sets consistent with one more workload 138 in the external domain 150. The enclave management module 330 then configures the enclave protection device 140 to permit traffic consistent with the relevant rules. The enclave management module 330 may provide updates to the membership information stored by the enclave protection device 140 that specifies the workloads 138 in the relevant workload groups for each rule (e.g., the workloads 138 having the label sets specified by the relevant rules). The enclave management module 330 may dynamically update the configuration of the enclave protection device 140 in response to changes to the labels of workloads 138, changes to the services provided by the workloads 138, or changes to the segmentation policy. In an alternative embodiment, as described above, the enclave protection device 140 may have rules configured independently of the policy management server 120. In this embodiment, the enclave management module 330 provides membership information for the workload groups associated with the independently configured rules of the enclave protection device 140 without necessarily configuring the rules themselves.

In an embodiment, the policy management server 120 may perform an optimization of the configuration of the enclave protection device 140 to reduce the number of enclave protection rules in the configuration. For example, in an embodiment, the policy management server 120 identifies two or more rules that share the same set of services, ports, and protocols (but may reference different source or destination groups). The policy management server 120 squashes these rules into a combined rule that references the shared services, ports, and protocols together with the multiple source groups and destination groups. The policy management server 120 may furthermore identify two or more rules that refer to the same sets of source groups and destination (but may have different services, ports, or protocols) and squash these rules into a single combined rule that references the common source and destination groups with the multiple different services, ports, or protocols.

The presentation module 340 interfaces with the administrative client 160 to present a user interface enabling an administrator to view a representation of the traffic flows, and to view, create, or modify rules associated with the segmentation policy. For example, the presentation module 340 may generate a graphical interface representing all or a portion of the traffic flow graph with the workloads 138 illustrated as nodes and the traffic flows to and from the workload 138 illustrated as edges connecting relevant nodes. An administrator may similarly select an edge on the graph to view information about the corresponding traffic flow such as, for example, services associated with the traffic flow, ports and protocols associated with the traffic flow, or statistical information associated with the traffic flow.

Figure 4:
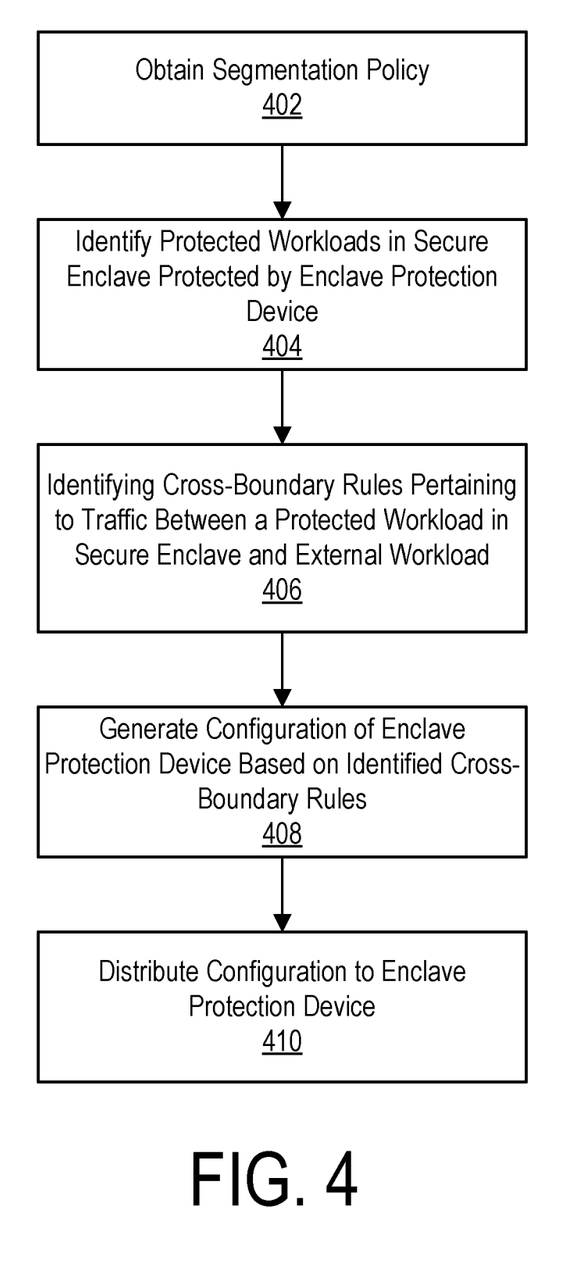
FIG. 4 is a flowchart illustrating an example embodiment of a process for managing a segmentation policy.

FIG. 4 is a flowchart illustrating an example embodiment of a process for generating a configuration of an enclave protection device 140 based on a segmentation policy. A policy management server 120 obtains 402 a segmentation policy comprising a set of segmentation rules for controlling traffic between workloads 138. The policy management server 120 also identifies 404 a set of protected workloads 138 in a secure enclave 150 that are protected by an enclave protection device 140. The policy management server 120 identifies 406 a set of cross-boundary rules in the segmentation policy that pertain to traffic between a protected workload 138 within the secure enclave 150 and an external workload 138 in the external subnet 170 outside the secure enclave 150. For example, the policy management server 120 identifies, for each segmentation rule, the label sets of workloads 138 specified by the rule, the set of workloads 138 having those label sets, and whether the set of workloads are in the secure enclave 150 or the external subnet 170. Rules that relate to traffic between at least one workload within the secure enclave 150 and at least one workload in the external subnet 170 are identified as cross-boundary rules. The policy management server 120 generates 408 a configuration of the enclave protection device 140 based on the identified cross-boundary rules. For example, the policy management server 120 generates a configuration that permits the same traffic that is permitted by the cross-boundary rules to pass through the enclave protection device 140. In an embodiment, the configuration for the enclave protection device 140 includes a set of enclave protection rules that specifies the services, ports, and/or protocols associated with permitted traffic and group identifiers for groups of permitted source and destination addresses falling under the rule. The configuration separately includes membership information specifying the workload identifiers for the workloads 138 in each of the groups referenced by the rules. The policy management server 120 distributes 410 the configuration to the enclave protection device 140 to enable the enclave protection device 140 to enforce the enclave protection rules consistent with the segmentation policy. In an embodiment, distributing the configuration may comprise transmitting a relevant update to the enclave protection device 140 without necessarily transmitting the entire configuration. For example, the policy management server 120 may transmit an update to the membership information when group membership changes without necessarily re-transmitting the enclave protection rules. Likewise, the policy management server 120 may transmit an update to the enclave protection rules in response to a change in the segmentation policy without necessarily re-transmitting the membership information if it is not affected by the change.

Figure 5:
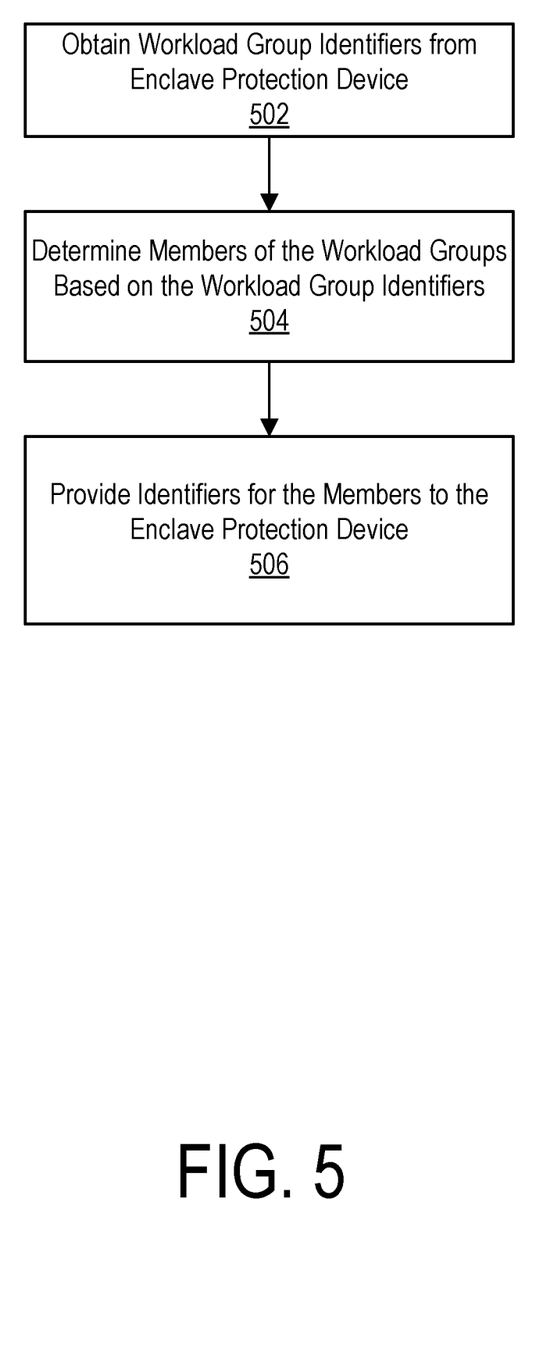
FIG. 5 is a flowchart illustrating an alternative example embodiment of a process for managing a segmentation policy.

FIG. 5 is a flowchart illustrating an alternative example embodiment of a process for generating a configuration of an enclave protection device 140 based on a segmentation policy. A policy management server 120 obtains 502 identifiers of workload groups for source and destination workloads 138 referenced in preconfigured rules of the enclave protection device 140 that permit traffic between the source and destination workloads 138. For example, the policy management server 120 may identify label sets for the workloads 138 in each workload group based on the name of the workload group. The policy management server 120 determines 504 identifiers for the workloads 138 in each of the workload groups and provides 506 the identifiers to the enclave protection device 140. In response to changes to the workloads 138 managed by the policy management server 120 that affect membership in various workload groups, the policy management may provide dynamic updates to the enclave protection device 140.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for managing a segmentation policy, the method comprising:
   obtaining a segmentation policy comprising a set of rules for controlling traffic between workloads;
   detecting a plurality of protected workloads that are members of a secure enclave protected by an enclave protection device such that traffic between the protected workloads and external workloads outside the secure enclave pass through the enclave protection device;
   determining, from the segmentation policy, a set of cross-boundary rules pertaining to traffic between at least one of the protected workloads and at least one of the external workloads, wherein determining the set of cross-boundary rules comprises:
      identifying a source label set and a destination label set specified by a segmentation rule of the segmentation policy;
      identifying a first workload having the source label set and a second workload having the destination label set;
      determining whether the first and second workloads are protected workloads or external workloads; and
      responsive to either the first workload being a protected workload and the second workload being an external workload or the first workload being an external workload and the second workload being a protected workload, including the segmentation rule in the set of cross-boundary rules;
   generating, from the set of cross-boundary rules, a configuration for the enclave protection device that causes the enclave protection device to permit the traffic meeting the set of cross-boundary rules, wherein generating the configuration for the enclave protection device comprises:
      identifying, in the cross-boundary rules, a set of duplicate rules;
      combining the duplicate rules into a combined rule; and
      replacing the duplicate rules with the combined rule in the cross-boundary rules, the configuration for the enclave protection device being based on the combined rule; and
   distributing the configuration to the enclave protection device to enable enforcement of the cross-boundary rules.

2. The method of claim 1, wherein the set of cross-boundary rules are permissive rules that cause the enclave protection device to allow the traffic between the at least one of the protected workloads and the at least one of the external workloads.

3. The method of claim 1, wherein generating the configuration of the enclave protection device comprises:
   generating an enclave protection rule that permits traffic between a first workload group identified by a first group identifier and a second workload group identified by a second group identifier that meets specified traffic criteria; and
   generating membership information specifying first workload identifiers for first workloads in the first workload group, and second workload identifiers for second workloads in the second workload group.

4. The method of claim 3, wherein the specified traffic criteria comprises at least one of: a service, a port, or a protocol.

5. The method of claim 3, wherein distributing the configuration to the enclave protection device comprises:
   detecting a change in the first workloads in the first workload group; and
   sending updated membership information to the enclave protection device reflecting the change without sending the enclave protection rule.

6. The method of claim 3, wherein distributing the configuration to the enclave protection device comprises:
   detecting a change in the segmentation policy that affects the enclave protection rule; and
   sending an updated enclave protection rule to the enclave protection device reflecting the change without sending the membership information.

7. The method of claim 1, wherein generating the configuration of the enclave protection device comprises:
   identifying, in the cross-boundary rules, a first rule referencing a set of one or more services, a first group of source workloads, and a first group of destination workloads, and a second rule referencing the set of one or more services, a second group of source workloads, and a second group of destination workloads; and
   generating, from the first and second rule, a combined rule that references the set of one or more services, a combined group of source workloads including the first and second groups of source workloads, and a combined group of destination workloads including the first and second groups of destination workloads.

8. The method of claim 1, wherein the set of duplicate rules comprises two or more rules that share a common set of services, ports, and protocols.

9. A non-transitory computer-readable storage medium storing instructions for managing a segmentation policy, the instructions, when executed by a computing system, causing the computing system to perform operations comprising:
   obtaining a segmentation policy comprising a set of rules for controlling traffic between workloads;
   detecting a plurality of protected workloads that are members of a secure enclave protected by an enclave protection device such that traffic between the protected workloads and external workloads outside the secure enclave pass through the enclave protection device;
   determining, from the segmentation policy, a set of cross-boundary rules pertaining to traffic between at least one of the protected workloads and at least one of the external workloads, wherein determining the set of cross-boundary rules comprises:
      identifying a source label set and a destination label set specified by a segmentation rule of the segmentation policy;
      identifying a first workload having the source label set and a second workload having the destination label set;
      determining whether the first and second workloads are protected workloads or external workloads; and
      responsive to either the first workload being a protected workload and the second workload being an external workload or the first workload being an external workload and the second workload being a protected workload, including the segmentation rule in the set of cross-boundary rules;
   generating, from the set of cross-boundary rules, a configuration for the enclave protection device that causes the enclave protection device to permit the traffic meeting the set of cross-boundary rules, wherein generating the configuration for the enclave protection device comprises:

identifying, in the cross-boundary rules, a set of duplicate rules;
combining the duplicate rules into a combined rule; and
replacing the duplicate rules with the combined rule in the cross-boundary rules, the configuration for the enclave protection device being based on the combined rule; and
distributing the configuration to the enclave protection device to enable enforcement of the cross-boundary rules.

10. The non-transitory computer-readable storage medium of claim 9, wherein the set of cross-boundary rules are permissive rules that cause the enclave protection device to allow the traffic between the at least one of the protected workloads and the at least one of the external workloads.

11. The non-transitory computer-readable storage medium of claim 9, wherein generating the configuration of the enclave protection device comprises:
generating an enclave protection rule that permits traffic between a first workload group identified by a first group identifier and a second workload group identified by a second group identifier that meets specified traffic criteria; and
generating membership information specifying first workload identifiers for first workloads in the first workload group, and second workload identifiers for second workloads in the second workload group.

12. The non-transitory computer-readable storage medium of claim 11, wherein the specified traffic criteria comprises at least one of: a service, a port, or a protocol.

13. The non-transitory computer-readable storage medium of claim 11, wherein distributing the configuration to the enclave protection device comprises:
detecting a change in the first workloads in the first workload group; and
sending updated membership information to the enclave protection device reflecting the change without sending the enclave protection rule.

14. The non-transitory computer-readable storage medium of claim 11, wherein distributing the configuration to the enclave protection device comprises:
detecting a change in the segmentation policy that affects the enclave protection rule; and
sending an updated enclave protection rule to the enclave protection device reflecting the change without sending the membership information.

15. The non-transitory computer-readable storage medium of claim 9, wherein generating the configuration of the enclave protection device comprises:
identifying, in the cross-boundary rules, a first rule referencing a set of one or more services, a first group of source workloads, and a first group of destination workloads, and a second rule referencing the set of one or more services, a second group of source workloads, and a second group of destination workloads; and
generating, from the first and second rule, a combined rule that references the set of one or more services, a combined group of source workloads including the first and second groups of source workloads, and a combined group of destination workloads including the first and second groups of destination workloads.

16. The non-transitory computer-readable storage medium of claim 9, wherein the set of duplicate rules comprises two or more rules that share a common set of services, ports, and protocols.

17. A computer system comprising:
one or more processors; and
a non-transitory computer-readable storage medium storing instructions for managing a segmentation policy, the instructions when executed by the one or more processors causing the one or more processors to perform steps including:
obtaining a segmentation policy comprising a set of rules for controlling traffic between workloads;
detecting a plurality of protected workloads that are members of a secure enclave protected by an enclave protection device such that traffic between the protected workloads and external workloads outside the secure enclave pass through the enclave protection device;
determining, from the segmentation policy, a set of cross-boundary rules pertaining to traffic between at least one of the protected workloads and at least one of the external workloads, wherein determining the set of cross-boundary rules comprises:
identifying a source label set and a destination label set specified by a segmentation rule of the segmentation policy;
identifying a first workload having the source label set and a second workload having the destination label set;
determining whether the first and second workloads are protected workloads or external workloads; and
responsive to either the first workload being a protected workload and the second workload being an external workload or the first workload being an external workload and the second workload being a protected workload, including the segmentation rule in the set of cross-boundary rules;
generating, from the set of cross-boundary rules, a configuration for the enclave protection device that causes the enclave protection device to permit the traffic meeting the set of cross-boundary rules, wherein generating the configuration for the enclave protection device comprises:
identifying, in the cross-boundary rules, a set of duplicate rules;
combining the duplicate rules into a combined rule; and
replacing the duplicate rules with the combined rule in the cross-boundary rules, the configuration for the enclave protection device being based on the combined rule; and
distributing the configuration to the enclave protection device to enable enforcement of the cross-boundary rules.

18. The computer system of claim 17, wherein generating the configuration of the enclave protection device comprises:
generating an enclave protection rule that permits traffic between a first workload group identified by a first group identifier and a second workload group identified by a second group identifier that meets specified traffic criteria; and
generating membership information specifying first workload identifiers for first workloads in the first workload group, and second workload identifiers for second workloads in the second workload group.

19. The computer system of claim 18, wherein distributing the configuration to the enclave protection device comprises:
detecting a change in the first workloads in the first workload group; and sending updated membership information to the enclave protection device reflecting the change without sending the enclave protection rule.

20. The computer system of claim 17, wherein generating the configuration of the enclave protection device comprises:
identifying, in the cross-boundary rules, a first rule referencing a set of one or more services, a first group of source workloads, and a first group of destination workloads, and a second rule referencing the set of one or more services, a second group of source workloads, and a second group of destination workloads; and
generating, from the first and second rule, a combined rule that references the set of one or more services, a combined group of source workloads including the first and second groups of source workloads, and a combined group of destination workloads including the first and second groups of destination workloads.

* * * * *